(12) United States Patent
Vontela et al.

(10) Patent No.: US 9,111,573 B1
(45) Date of Patent: Aug. 18, 2015

(54) DETECTION OF END OF PREAMBLE IN READ CHANNEL WITHOUT INTERPOLATION

(71) Applicant: LSI Corporation, San Jose, CA (US)

(72) Inventors: Siva Swaroop Vontela, Longmont, CO (US); Scott M. Dziak, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/248,943

(22) Filed: Apr. 9, 2014

Related U.S. Application Data

(60) Provisional application No. 61/973,345, filed on Apr. 1, 2014.

(51) Int. Cl.
*G11B 5/09* (2006.01)
*G11B 20/10* (2006.01)
*G11B 20/12* (2006.01)

(52) U.S. Cl.
CPC ...... *G11B 20/10046* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 5,793,548 A * | 8/1998 | Zook | | 360/51 |
| 5,892,632 A * | 4/1999 | Behrens et al. | | 360/51 |
| 6,023,386 A * | 2/2000 | Reed et al. | | 360/51 |
| 6,480,984 B1 * | 11/2002 | Aziz | | 714/795 |
| 6,594,098 B1 * | 7/2003 | Sutardja | | 360/65 |
| 6,606,728 B1 * | 8/2003 | Aziz | | 714/792 |
| 8,027,114 B1 * | 9/2011 | Han et al. | | 360/51 |
| 8,049,982 B1 * | 11/2011 | Grundvig et al. | | 360/50 |
| 8,077,419 B1 * | 12/2011 | Pai et al. | | 360/65 |
| 8,970,975 B1 * | 3/2015 | Dziak et al. | | 360/31 |
| 2002/0154430 A1 * | 10/2002 | Rae et al. | | 360/25 |
| 2003/0095350 A1 * | 5/2003 | Annampedu et al. | | 360/39 |
| 2010/0061490 A1 | 3/2010 | Noeldner | | |
| 2015/0085392 A1 * | 3/2015 | Dziak et al. | | 360/31 |

* cited by examiner

*Primary Examiner* — Peter Vincent Agustin
(74) *Attorney, Agent, or Firm* — Suiter Swantz pc llo

(57) ABSTRACT

A method and system for detecting an end of a preamble without interpolation. The method includes receiving information from a zero phase start module, the information including a target phase constraint, a polyant, and a zero phase start phase. The method also includes selecting two samples per preamble cycle of short filter outputs and long filter outputs based on the target phase constraint, the polyant, and the zero phase start phase. The method further includes decimating the short filter outputs and the long filter outputs such that the selected two samples for each of the filters per preamble cycle are output upon decimation. The method additionally includes performing a sign comparison on the corresponding short filter and long filter outputs after decimation, wherein a sign mismatch of the corresponding short filter and long filter outputs indicates an end of a preamble.

20 Claims, 8 Drawing Sheets

DETECTION OF END OF PREAMBLE IN READ CHANNEL WITHOUT INTERPOLATION

CROSS-REFERENCE TO RELATED APPLICATIONS

This application claims the benefit of U.S. Provisional Application No. 61/973,345, filed on Apr. 1, 2014.

FIELD OF THE INVENTION

Embodiments of the invention are directed generally toward a method, circuit, apparatus, and system for detecting ends of preambles.

BACKGROUND

Current read channels typically use interpolation-based preamble detection; however, interpolation-based preamble detection typically suffers from significant performance loss and inaccurate preamble detection at high noise conditions (low signal-to-noise ratios). Therefore, it would be desirable to provide a method and system configured to increase system performance, even at high noise conditions.

SUMMARY

Accordingly, an embodiment includes a method for detecting an end of a preamble without interpolation. The method includes receiving information from a zero phase start module, the information including a target phase constraint, a polyant, and a zero phase start phase. The method also includes selecting two samples per preamble cycle of short filter outputs and two samples per preamble cycle of long filter outputs based on the target phase constraint, the polyant, and the zero phase start phase. The method further includes decimating the short filter outputs and the long filter outputs such that the selected two samples for each of the short and long filters per preamble cycle are output upon decimation. The method additionally includes performing a sign comparison on the corresponding short filter and long filter outputs after decimation, wherein a sign mismatch of the corresponding short filter and long filter outputs indicates an end of a preamble.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Figure 1:
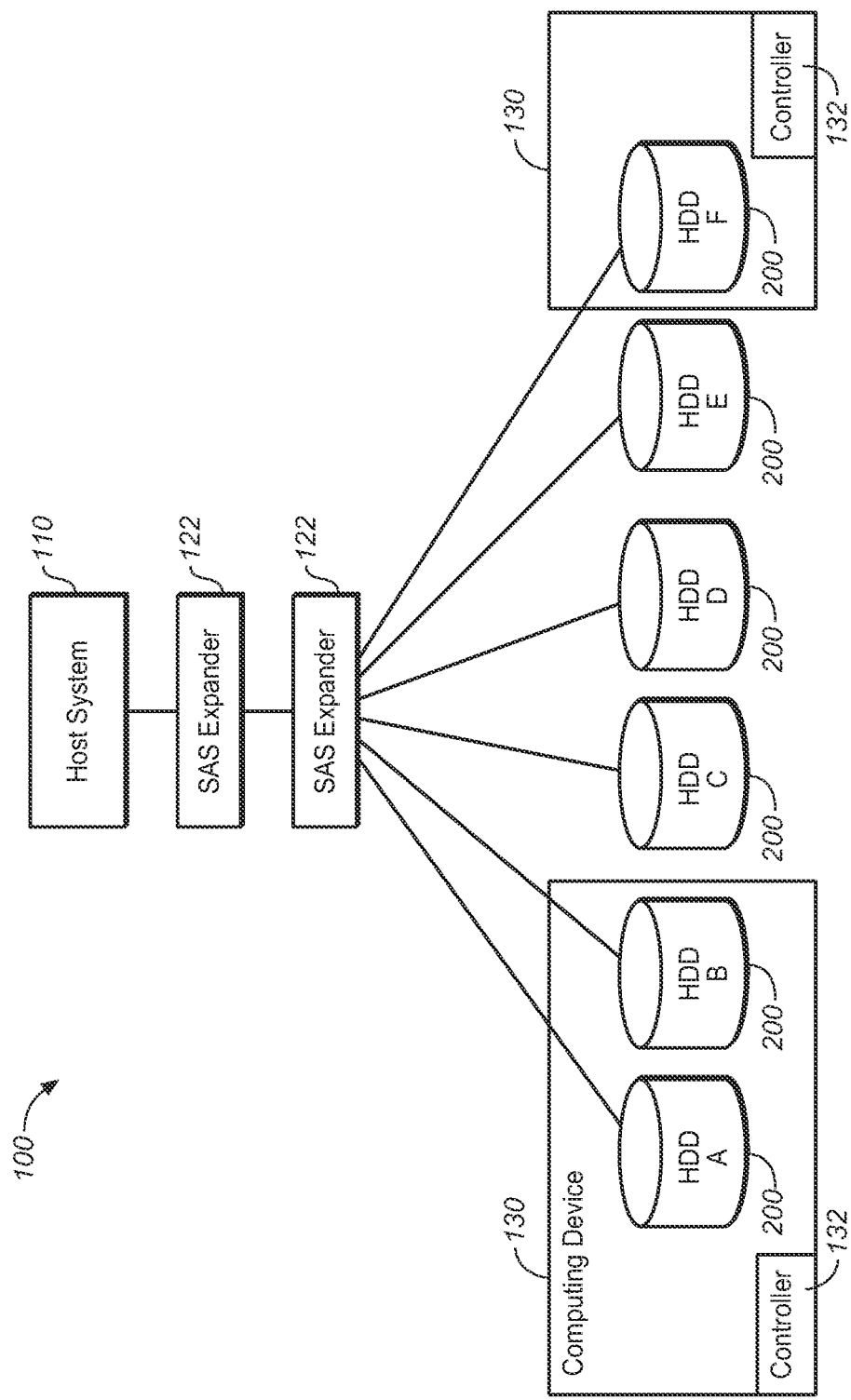
FIG. 1 shows an exemplary communicatively coupled system topology.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Some embodiments of the invention include a method, apparatus, software or firmware, service, at least one circuit, and/or system configured to improve performance of preamble detection and configured to decrease loop latency with respect to reading, writing, signal processing, and/or recovering errors in non-volatile computer-readable media (e.g., non-transitory computer-readable/writable media, such as a hard-disk drive, solid state drive, or the like).

In current read channels, a periodic preamble (usually having a 4T frequency (e.g., a repeating "1100" pattern)) precedes sync mark data for timing and gain acquisition. In some embodiments of the invention, if it is known that read-back is on preamble, ZPS-phase-based reference samples can be used rather than the detector decision-based reference samples to compute timing and/or gain error; embodiments, which use ZPS phase-based reference samples, result in lower loop latency. Accurate detection of preamble is critical for switching the error source during transition from preamble to user data. Current read channels with 4T preamble implementations detect the end of the preamble by signaling a still4T flag that is set up as a hair-trigger switch to switch the error source; however, current implementations often result in inaccuracies (especially under high noise conditions), including: a) falsely signaling an end of a preamble, which results in minor performance degradation (e.g., increased loop latency), and b) missing the detection of the end of the preamble, which results in severe performance degradation because preamble-based reference samples must then be used rather than sync mark and/or random data. While current read channels use interpolation based preamble detection which suffers from significant performance loss at high noise conditions (low SNR), embodiments of the invention include detecting preamble (e.g., at 1/4T and 1/6T frequencies) without interpolation; as such, embodiments of the invention are configured to significantly improve performance of preamble detection over existing approaches.

Some embodiments of the invention are configured to perform the preamble detection process and configured to reduce loop latency without interpolation. Some embodiments include a short filter (YS) and a long filter (YL) having the same magnitude and phase response at a particular preamble frequency. Some embodiments are configured to decimate (e.g., downsample) the short filter (YS) and long filter (YL) samples by a factor (e.g., a factor of 2 (for implementations with a 4T preamble), by a factor of 3 (for implementations with a 6T preamble), or by another factor for implementations with an NT preamble, or the like) and to provide decimated outputs which are closer to peak points based on ZPS and target phase information. (In a sinusoidal preamble signal, the peak points are $$P\sin\frac{n\pi}{2}$$

where n is an odd integer. So the peak points are . . . , P, −P, P, −P, . . . ) Additionally, in some embodiments, decimated samples are used for sign comparison to detect the end of the preamble (e.g., still4T/still6T=−(sign[YS(k)]^sign[YL(k)])). Some embodiments include decimating the filter outputs and ensuring that the downsampled outputs are closer to peak points by using the target phase and ZPS information; this allows for the samples to have higher noise margin as compared to the current 4T detector implementations with interpolation. Thus, embodiments of the invention have better detection rate at higher noise conditions than current 4T detector implementations with interpolation.

Referring to FIG. 1, an exemplary communicatively coupled system topology 100 including a host system 110, a plurality of expanders 122 (such as Serial Attached Small Computer System Interface (SAS) expanders, or the like), a plurality of computing devices 130 (such as storage systems), and a plurality of storage devices 200 (e.g., hard disk drives (HDDs) 200, solid state drives, cache storage media, or the like (in various configurations and arrangements)) is depicted. For example, each computing device 130 can include one or more controllers 132 (such as a storage controller, or the like) and one or more storage devices 200 (such as HDDs, solid state drives, cache, or the like), as well as any other computer components (not shown), such as one or more processors, one or more network cards, one or more busses, one or more memories, cache, software, firmware, a power supply, wired or wireless connectivity to other devices, or the like. In some exemplary embodiments, one or more of the computing devices 130 are implemented as a RAID (a redundant array of independent disks or a redundant array of independent storage devices) system, wherein the one or more of the storage devices 200 (e.g., hard disk drives, solid state drives, a cache storage medium, or the like) are implemented in a RAID configuration; in some exemplary embodiments, the controller 132 of the RAID system comprises a RAID-enabled controller.

Figure 2:
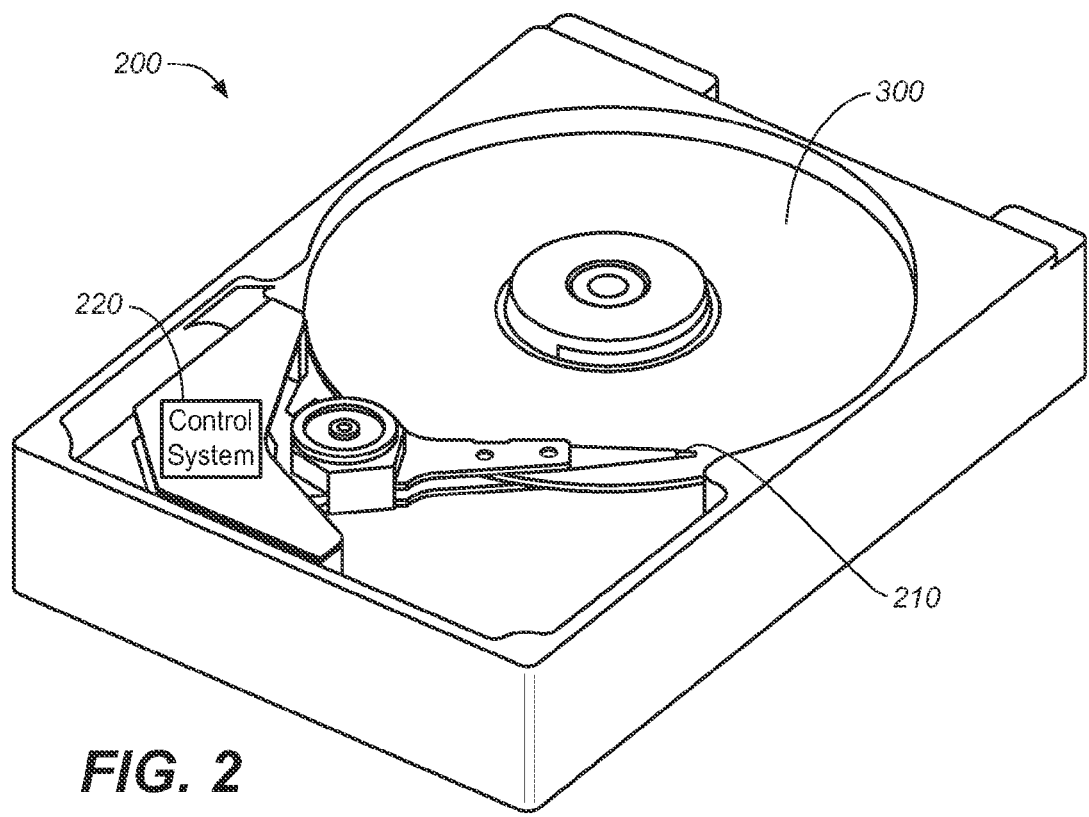
FIG. 2 shows an exemplary storage device.

Referring to FIG. 2, an exemplary hard disk drive 200 suitable for embodiments of the invention is depicted. The hard disk drive 200 includes one or more platters 300, one or more read/write heads 210, and a control system 220, as well as other components known to one of ordinary skill in the art. Each of the one or more read/write heads 210 includes one or more magnetic heads configured to read and write raw data streams to a particular platter 300 of the hard disk drive 200. In embodiments of the invention, the control system 220 includes one or more electronic circuits. The one or more electronic circuits can comprise a phase-locked loop circuit (such as a digital phase-locked loop or an all-digital phase-locked loop).

Figure 3:
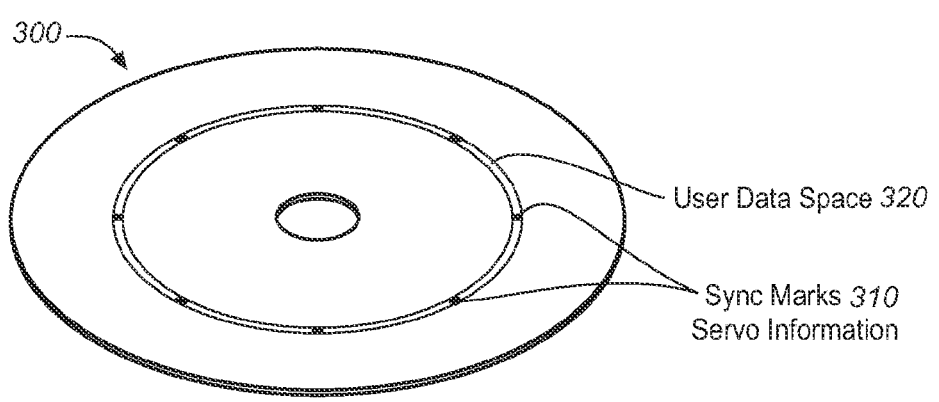
FIG. 3 shows an exemplary platter of a hard disk drive.

Referring to FIG. 3, an exemplary platter 300 of a hard disk drive 200 is depicted. The platter 300 includes a plurality of user data spaces 320 and a plurality of sync marks 310. Each of the plurality of sync marks 310 provides servo information configured to be read by a read/write head 210. A sync mark is a field that allows for the detection of the first bit of a particular user data space. This servo information is used by the control system 220 for the synchronization and timing of read/write events.

While FIGS. 1-3 depict an exemplary embodiment implemented within one or more storage devices 200 (e.g., one or more hard disk drives or components thereof), one of ordinary skill in the art will appreciate that other embodiments may comprise different implementations without departing from the scope or spirit of the disclosure. For example, some embodiments may be applied to, implemented in, and/or implemented as circuits, methods, apparati, systems, and/or computer-executable instructions of or for digital signal processing (DSP), coding, read channels, read-write channels, communication channels, storage systems (such as RAID systems or the like), or the like; furthermore, some embodiments may include one or more virtualized hard disk drives implemented on another storage device (such as a solid state drive) or a virtualized circuit performing a method of some embodiments.

It should be noted that each of the storage system 100 or storage devices 200 may be implemented as a RAID (redundant array of inexpensive storage devices or redundant array of independent storage devices) based storage system. Additionally, each storage system 200 may be integrated into a larger storage system such as, for example, a RAID (redundant array of inexpensive storage devices or redundant array of independent storage devices) based storage system. Such a RAID storage system increases stability and reliability through redundancy, combining multiple storage devices as a logical unit. Data may be spread across a number of storage devices included in the RAID storage system according to a variety of algorithms and accessed by an operating system as if it were a single storage device. For example, data may be mirrored to multiple storage devices in the RAID storage system, or may be sliced and distributed across multiple storage devices in a number of techniques. If a small number of storage devices in the RAID storage system fail or become unavailable, error correction techniques may be used to recreate the missing data based on the remaining portions of the data from the other storage devices in the RAID storage system. The storage devices in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

As mentioned previously, the storage device configuration and storage system configuration can be varied in other embodiments of the invention. For example, the storage device 200 may comprise a hybrid HDD which includes a flash memory in addition to one or more storage disks.

In addition, one or more of the storage devices 200 may be coupled to or incorporated within a host processing device, which may be a computer, server, communication device, etc.

Multiple storage devices 200 (some or all possibly comprising various different types) may be incorporated into or implemented as a virtual storage system. The virtual storage system, also referred to as a storage virtualization system, comprises a virtual storage controller coupled to a RAID system, where RAID denotes Redundant Array of Independent storage Devices. In some embodiments, the RAID system more specifically comprises N distinct storage devices, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types, quantities, and arrangements of storage disks, read/write heads, read channel circuitry, signal processing circuitry, decoders, filters, detectors, and other storage device elements for implementing the described functionality. Also, the particular manner in which certain steps are performed in the signal processing may vary. Further, although embodiments of the invention have been described with respect to storage disks such as HDDs, embodiments of the invention may also be implemented as various other devices including in optical data-storage applications and wireless communications. These and numerous other alternative embodiments within the scope of the following claims will be apparent to those skilled in the art.

Figure 4:
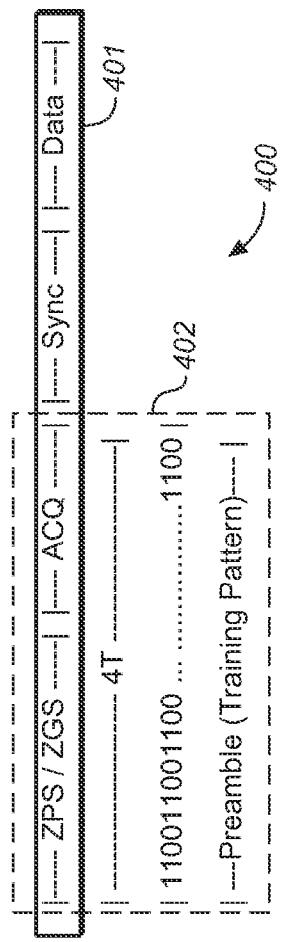
FIG. 4 shows an interval diagram of a data sector.

Referring to FIG. 4, an exemplary interval diagram of an exemplary fragment 401 of an exemplary data sector 400 of some embodiments showing a preamble 402 and user data is depicted. In some embodiments, the data sector 400 comprises a single fragment 401. The preamble 402 may comprise a training pattern, which is a known/predetermined pattern (e.g., a repeating pattern of "1100", such as "110011001100 . . . 1100"; a repeating pattern of "111000", such as "111000111000111000 . . . 111000"; or the like). In some embodiments the preamble 402 may have a length of N*T (where "T" is a temporal frequency (i.e., the inverse of a frequency); i.e., where T=1/(data rate); and where N is a positive even integer value (e.g., 4, 6, or the like)). In some embodiments, the preamble 402 corresponds to performing a ZPS/ZGS cycle and an acquisition cycle. For example, in an exemplary embodiment, during or corresponding to a fragment 401, a full ZPS/ZGS cycle and acquisition cycle includes a plurality of intervals and read-back of user data. During a ZPS/ZGS interval, the read channel accumulates an incoming signal. During a ZPS/ZGS Calculation Interval, the read channel measures phase and gain of the incoming signal. During a Phase Slew/Gain Adjust Interval, the read channel aligns a system clock to that of the incoming signal and adjusts a gain; the length of time required to complete the third interval is in part a function of the difference of the system clock phase and the phase of the incoming signal. During an Acquire interval, the read channel makes fine adjustments to the system clock to align the incoming signal and makes fine gain adjustments. It should be noted that the fourth interval may overlap with the third interval. During a Post Acquire interval, the system continues making fine adjustments to the system clock and for one or more sync marks. During a Sync Mark interval, the read channel acquires the sync mark information; a sync mark is a field that allows for the detection of the 1st bit of user data. User data follows the aforementioned intervals included in the fragment. While FIG. 4 shows an exemplary fragment 401 of an exemplary embodiment, some embodiments may include shorter (or longer) preambles and the corresponding performance of ZPS/ZGS cycle and acquisition cycle may also be shorter or longer; for example, in exemplary embodiments, the performance of particular cycles or intervals may be overlapped, bypassed, or otherwise skipped to reduce the necessary size or length of a preamble; furthermore, some embodiments may include the performance of other intervals or cycles.

Figure 5:
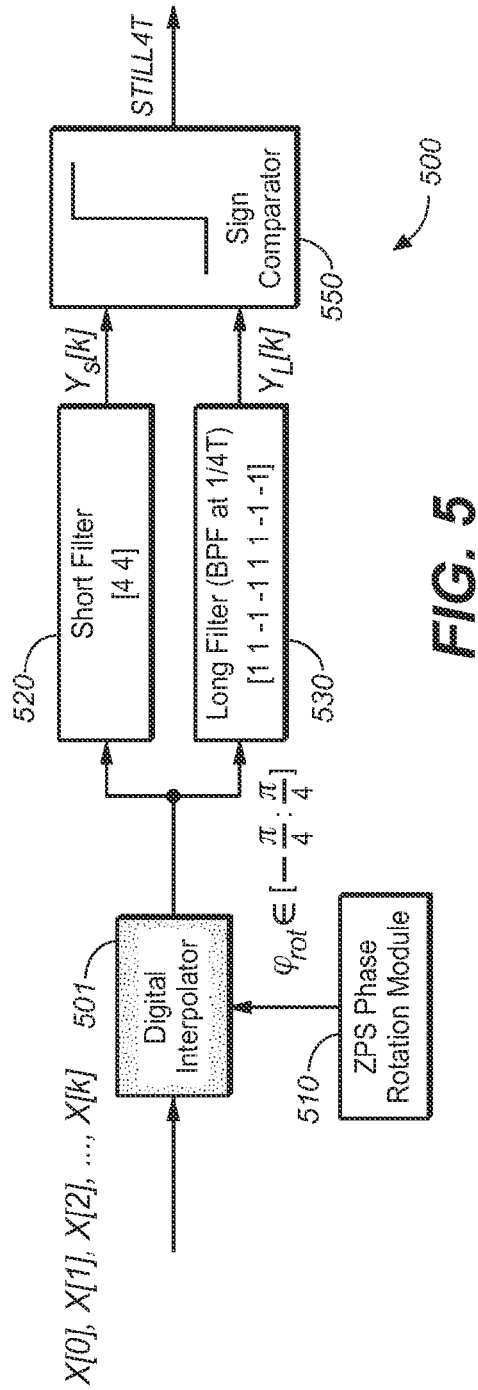
FIG. 5 shows a current implementation of 4T preamble detection.

Referring now to FIG. 5, an example of currently implemented system 500 for end of preamble detection is shown. The currently implemented system 500 for end of preamble detection includes a digital interpolator 501, a ZPS (zero phase start) phase rotation module 510, a short filter 520, a long filter 530, and a sign comparator 550. In current implementations for detection of the end of a 4T preamble, an input sample stream (i.e., X[0], X[1], X[2], . . . X[k]) is interpolated with ZPS phase slew information such that the interpolator 501 output is always driven to (nπ/2) phase, where n is an integer. That is, the interpolator 501 output samples are of the form { . . . , P, 0, −P, 0, . . . }, where P is a particular magnitude of the interpolator output sample.

Short and long filters are defined as follows for the case of an end of 4T preamble detection: A short filter may be an FIR (finite impulse response) filter with coefficients [4 4]. A long filter may be an FIR filter with coefficients [1 1 −1 −1 1 1 −1 −1] which may be a band pass filter tuned to 4T preamble frequency. These two filters have the same magnitude and the phase response at 4T preamble frequency and shift phase of the incoming sample stream by π/4 as shown in FIG. 6C.

Short and long filters are defined as follows in the case of an end of 6T preamble detection: A short filter may be an FIR (finite impulse response) filter with coefficients [4 4]. A long filter may be an FIR filter with coefficients [1 1 0 −1 −1 0 1 1 0 −1 −1 0] which may be a band pass filter tuned to 6T preamble frequency. These two filters have same magnitude and phase response at 6T preamble frequency and shift phase of the incoming sample stream by π/6 as shown in FIG. 7C.

In current implementations of 4T preamble detection, the interpolated output samples are passed through two (π/4) phase shifting filters: a short filter 520 and a long filter 530. The short filter output, $Y_S(k)$, is as follows: $Y_S(k)$=4*X[k]+4*X[k−1]. The long filter output, $Y_L(k)$, is as follows: $Y_L(k)$=X[k]+X[k−1]−X[k−2]−X[k−3]+X[k−4]+X[k−5]−X[k−6]−X[k−7]. The long filter 530 is a band pass filter at 4T frequency.

In current implementations, signs of the output samples of the two filters 520, 530 are compared by the sign comparator 550 to generate a still4T value, where still4T value is as follows: still4T=~(sign[$Y_S(k)$]^sign[$Y_L(k)$]), such that a) if the sign of $Y_S(k)$ and $Y_L(k)$ is the same, the sign comparator 550 returns a value of 1, and b) if the sign of $Y_S(k)$ and $Y_L(k)$ is different, the sign comparator 550 returns a value of 0. If the sign of $Y_S(k)$ and $Y_L(k)$ is the same then it is determined that the read channel is on the preamble; however, if the sign of $Y_S(k)$ and $Y_L(k)$ is different, then it is determined that the that preamble has ended. That is, every fragment starts with still4T set to "1", and the first sign mismatch triggers still4T to return "0", and still4T remains "0" for the rest of the data field of the current fragment.

Current implementations for end of preamble detection, however, have significant limitations. For example, the digital interpolator 501 adds additional delay to the still 4T generation latency, which increases loop latency during preamble. Additionally, implementing interpolator phase rotation is complicated and needs to take into account proper saturation of input phase to avoid +/−T phase shifts at the interpolator output. Also, detection of orthogonal preambles (e.g., 6T frequency, such as with a "111000" preamble pattern) for multi-sensor magnetoresistive (MSMR) channels with current interpolator implementations adds to design complexity and expense. However, embodiments of the invention provide a solution to these problems, whereby sign comparison at the outputs of the short and long filters can be used without interpolating the input samples.

Referring now to FIGS. 6A-6C and 7A-7C, exemplary embodiments of exemplary systems configured to detect the end of preambles without interpolation are illustrated.

Figures 6A, 6B:
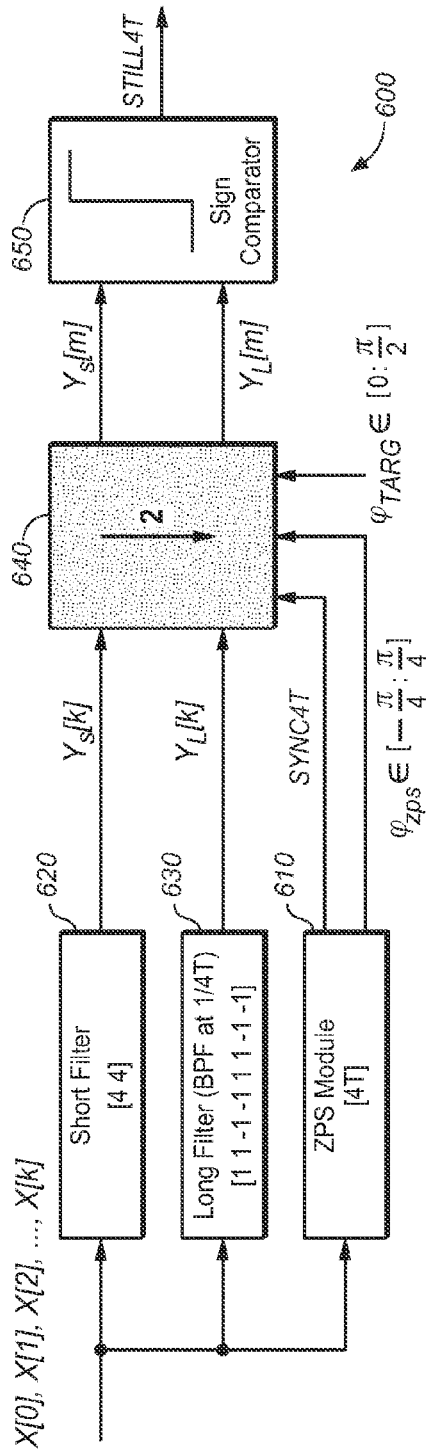
FIG. 6A shows an exemplary implementation of 4T preamble detection without interpolation of some embodiments.
FIG. 6B shows an exemplary decimation table associated with the implementation shown in FIG. 6A for 4T preamble detection without interpolation of some embodiments.
Figure 6C:
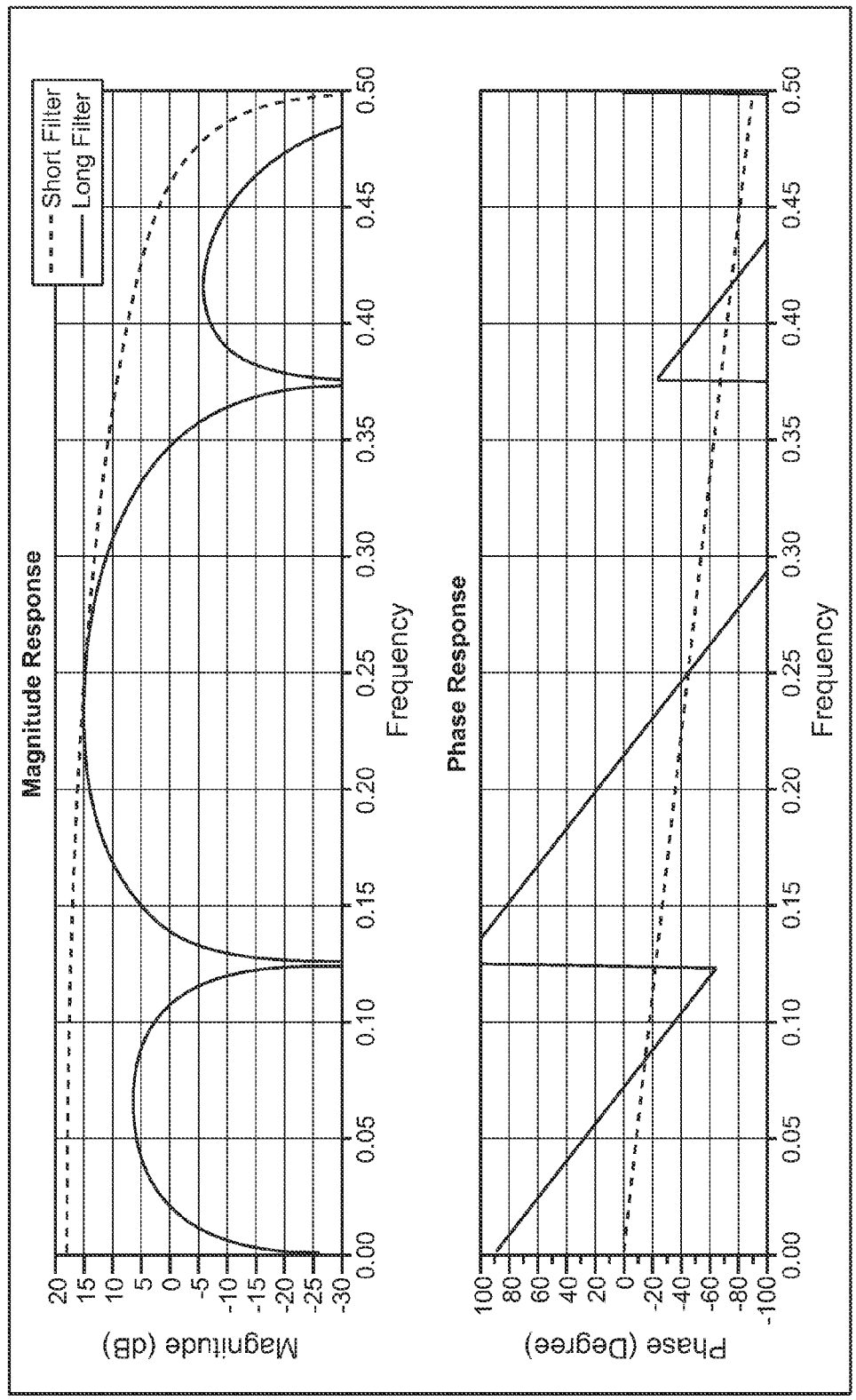
FIG. 6C shows an exemplary diagrammatic graph representation of the magnitude response and the phase response of a long filter and a short filter associated with the implementation shown in FIG. 6A for 4T preamble detection without interpolation of some embodiments.
Figures 7A, 7B:
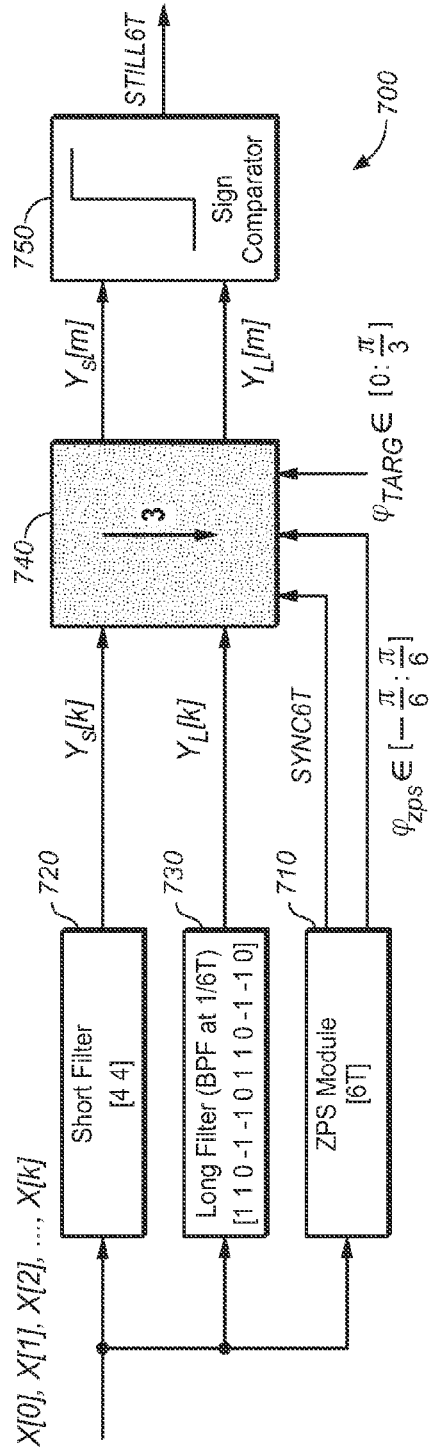
FIG. 7A shows an exemplary implementation of 6T preamble detection without interpolation of some embodiments.
FIG. 7B shows an exemplary decimation table associated with the implementation shown in FIG. 7A for 6T preamble detection without interpolation of some embodiments.
Figure 7C:
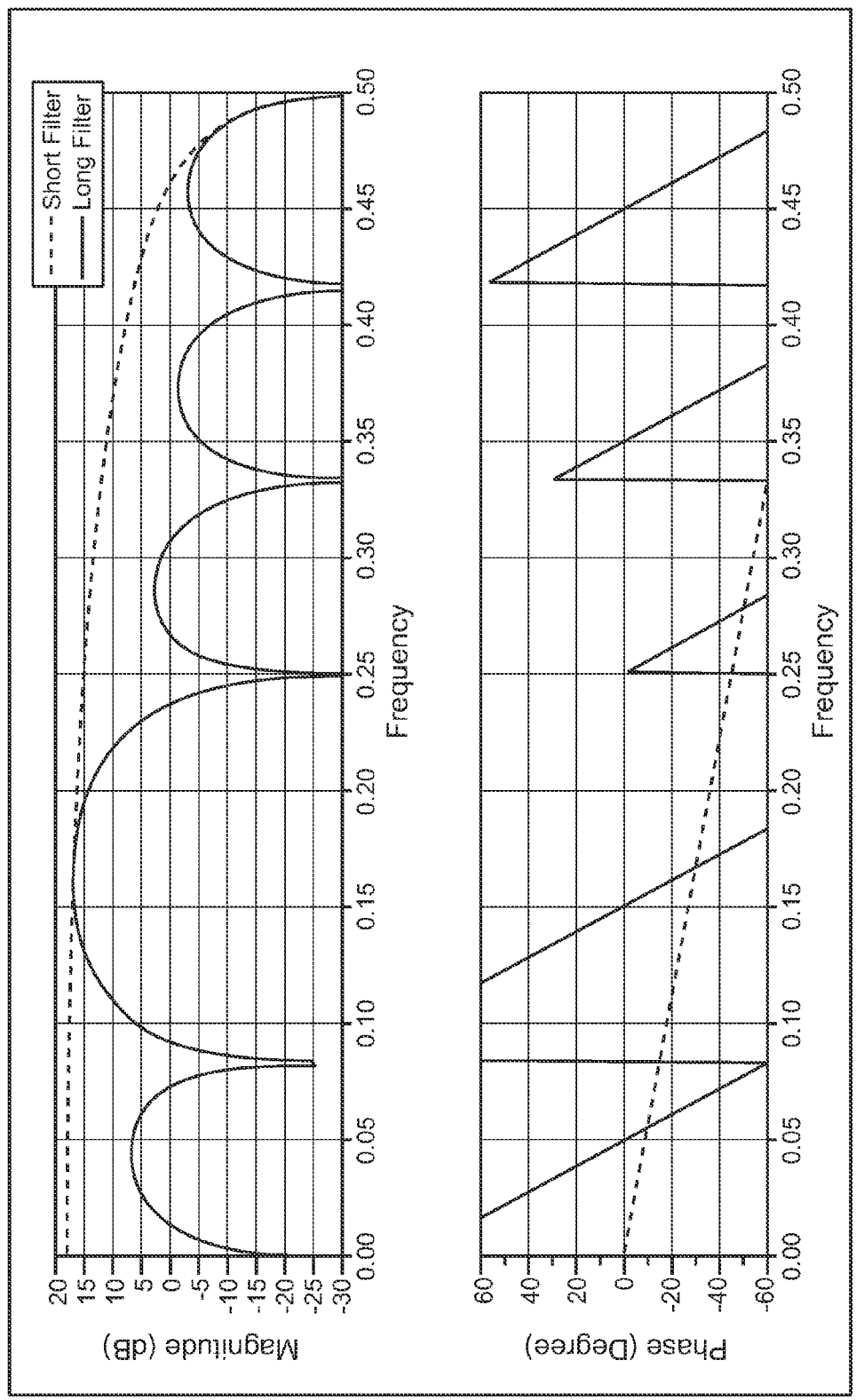
FIG. 7C shows an exemplary diagrammatic graph representation of the magnitude response and the phase response of a long filter and a short filter associated with the implementation shown in FIG. 7A for 6T preamble detection without interpolation of some embodiments.

Referring now to FIGS. 6A and 7A, in some embodiments, the system (e.g., 600, 700) is a storage system, storage device, read channel, a communication channel, a signal processing apparatus (e.g., a digital signal processing apparatus), or the like. The system (e.g., 600, 700) may receive a stream of input samples (e.g., X[0], X[1], X[2], . . . X[k]). In some embodiments, the stream of input samples (e.g., X[0], X[1], X[2], . . . X[k]) may be received from an analog-to-digital converter (ADC). The input sample phases may be arbitrary during ZPS phase rotation, and because input sample phases may be arbitrary during ZPS phase rotation, the phase at the outputs of the short and long filters will also be arbitrary without interpolating the input samples.

During ZPS implemented with an NT preamble (where N is a positive even integer with values 4, 6, . . . ), while a phase of the input samples (e.g., X) rotates from an arbitrary phase to a target phase, a phase of the short filter ($Y_S$) and the long filter ($Y_L$) samples rotates from a shifted arbitrary phase to a shifted target phase. The short filter and the long filter shift the phase of input samples by a phase response of the filters (which is TUN at NT preamble frequency) to output a shifted arbitrary phase (i.e., input arbitrary phase shifted by π/N) and a shifted target phase (i.e., target phase shifted by TUN), wherein the short filter and the long filter have the same phase response.

For exemplary implementations with an NT preamble, the phase of the input samples (e.g., X) may rotate from ($\phi_{TARG}$+SYNCNT*(2π/N)−$\phi_{ZPS}$) to ($\phi_{TARG}$+SYNCNT*(2π/N)), where $\phi_{TARG}$ is an NT target phase constraint such that $\phi_{TARG}\epsilon[0:(2\pi/N)]$, where $\phi_{ZPS}$ is a ZPS phase such that $\phi_{ZPS}\epsilon[-\pi/N:\pi/N]$, where SYNCNT indicates a polyant (e.g., a quadrant for N=4, a hexant for N=6, an octant for N=8, or the like) of X[0] as it converges to the target phase such that SYNCNT $\epsilon[0:N-1]$. As the phase of the input samples (e.g., X) rotates from an arbitrary phase to a target phase, the phase of the short filter outputs and the long filter outputs rotates from ($\phi_{TARG}$+SYNCNT*(2π/N)−$\phi_{ZPS}$−(π/N)) to ($\phi_{TARG}$+SYNCNT*(2π/N)−(π/N)), where (π/N) is the phase response of the short filter and the long filter.

Based upon the NT target phase constraint (i.e., φTARG), the polyant value (i.e., SYNCNT), and the ZPS information from the ZPS module phase (φZPS), embodiments of the invention are configured to predict the phase of the outputs of the short filter and the long filter at any particular time. Out of every N samples during an NT preamble cycle, two samples of the short filter outputs and the long filter outputs can be selected based upon the NT target phase constraint, the polyant, and the ZPS phase. Additionally, embodiments include decimating the short filter outputs and the long filter outputs such that the selected two samples for each of the short filter and long filter per preamble cycle are output upon decimation; the two selected samples tend to be (e.g., are always) distant from zero crossing points and have enough margin for noise to be used for sign comparison by a comparator. (In a sinusoidal preamble signal, the zero crossing points are $$P\sin\frac{n\pi}{2}$$

where n is an even integer. So the zero crossing points are 0, 0, 0, 0, . . . ) In some embodiments, decimating the short filter output samples and the long filter output samples by a factor of N/2 (e.g., by a factor of 2 for a 4T preamble implementation, by a factor of 3 for a 6T preamble implementation, or the like) ensures that the downsampled (e.g., decimated) outputs are closer to peak points based on ZPS and target phase information. (In a sinusoidal preamble signal, the peak points are $$P\sin\frac{n\pi}{2}$$

where n is an odd integer. So the peak points are . . . , P, −P, P, −P, . . . ) Furthermore, embodiments of the invention include performing a sign comparison on the selected samples after decimation, wherein a sign mismatch of the corresponding short filter and long filter outputs indicates an end of a preamble.

Referring now to FIG. 6A, embodiments of the invention include a system 600 configured to detect the end of a 4T preamble without interpolation. In some embodiments, the system 600 includes a ZPS module 610, a short filter 620, a long filter 630, a decimator 640, and a sign comparator 650. The system 600 may be configured to receive a stream of input samples (e.g., X[0], X[1], X[2], X[k]). In some embodiments, the stream of input samples (e.g., X[0], X[1], X[2], X[k]) may be received from an analog-to-digital converter (ADC) (not shown). The input sample phases may be arbitrary during ZPS phase rotation, and because input sample phases may be arbitrary during ZPS phase rotation, the phase at the outputs of the short filter 620 and the long filter 630 may also be arbitrary without interpolating the input samples.

Still referring to FIG. 6A, in some embodiments, during ZPS with a 4T preamble implementation and while a phase of the input samples (e.g., X) rotates from an arbitrary phase to a target phase, a phase of samples output from the short filter ($Y_S$) 620 and the long filter ($Y_L$) 630 rotates from a shifted arbitrary phase to a shifted target phase. The short filter 620 and the long filter 630 shift the phase of input samples by a phase response of the filters 620, 630 (π/4 at 4T preamble frequency) to output a shifted arbitrary phase (i.e., input arbitrary phase shifted by π/4) and a shifted target phase (i.e., target phase shifted by π/4), wherein the short filter 620 and the long filter 630 may have the same phase response.

For exemplary implementations with an 4T preamble (as shown in FIGS. 6A, 6B, and 6C), the phase of the input samples (e.g., X) may rotate from $$(\phi_{TARG}+SYNC4T*(\pi/2)-\phi_{ZPS}) \text{ to } (\phi_{TARG}+SYNC4T*(\pi/2)),$$

where $\phi_{TARG}$ is a 4T target phase constraint such that $\phi_{TARG}\epsilon[0:(\pi/2)]$, where $\phi_{ZPS}$ is a ZPS phase such that $\phi_{ZPS} \epsilon[-\pi/4:\pi4)$, where SYNC4T indicates a quadrant of X[0] as it converges to the target phase such that SYNC4T $\epsilon$[0:3]. As the phase of the input samples (e.g., X) rotates from an arbitrary phase to a target phase, the phase of the short filter outputs and the long filter outputs rotates from $$(\phi_{TARG}+SYNC4T*(\pi/2)-\phi_{ZPS}-(\pi/4)) \text{ to } (\phi_{TARG}+SYNC4T*(\pi/2)-(\pi/4)),$$

where (π/4) is the phase response of the short filter 620 and the long filter 630.

Still referring to FIG. 6A, based upon the 4T target phase constraint (i.e., $\phi_{TARG}$), the quadrant value (i.e., SYNC4T), and the ZPS information from the ZPS module phase ($\phi_{ZPS}$), embodiments of the invention are configured to predict the phase of the outputs of the short filter 620 and the long filter 630 at any particular time. Out of every 4 samples during a 4T preamble cycle, two samples of the short filter outputs and two samples of the long filter outputs can be selected based upon the 4T target phase constraint, the quadrant, and the ZPS phase. Additionally, embodiments include decimating the short filter samples and the long filter samples such that the selected two samples per preamble cycle are output upon (e.g., after) decimation; the two selected samples tend to be (e.g., are always) distant from zero crossing points and have enough margin for noise to be used for sign comparison by a comparator 650. (In a sinusoidal preamble signal, the zero crossing points are $$P\sin\frac{n\pi}{2}$$

where n is an even integer. So the zero crossing points are 0, 0, 0, 0, . . . ) In some embodiments, decimating the short filter output samples and the long filter output samples by a factor of 2 for a 4T preamble implementation ensures that the downsampled (e.g., decimated) outputs are closer to peak points based on ZPS and target phase information. (In a sinusoidal preamble signal, the peak points are $$P\sin\frac{n\pi}{2}$$

where n is an odd integer. so the peak points are . . . , P, –P, P, –P, . . . )

Referring now to FIG. 6B, an exemplary decimation table 601 associated with the implementation shown in FIG. 6A for 4T preamble detection without interpolation of some embodiments is shown. The decimation table 601 demonstrates exemplary situations for how the decimator 640 will select two samples and perform a decimation for various scenarios. For example, the decimator 640 will select and output two samples of a plurality of samples from the long filter 630 and short filter 620 based on the target phase constraint ($\phi_{TARG}$), the zero phase start phase ($\phi_{ZPS}$), and a value of a quadrant (SYNC4T). For example, if the target phase constraint ($\phi_{TARG}$) is between 0 and π/8, if the zero phase start phase ($\phi_{ZPS}$) is positive (i.e., greater than or equal to zero), and if the value of the quadrant (SYNC4T) is 0 or 2, then the Y[0] sample and the Y[2] sample for each of the two filters will be selected for the particular preamble cycle and sent to the sign comparator 650 to determine or detect whether the preamble has ended. Likewise, the decimator 640 may select and output other particular two samples based upon the particular target phase constraint ($\phi_{TARG}$), the particular zero phase start phase ($\phi_{ZPS}$), and the particular quadrant (SYNC4T) for each particular preamble cycle, as shown in FIG. 6B. In some embodiments, the decimator 640 is implemented as two or more decimators. For example, a first particular decimator may select and output two samples of a plurality of samples from the long filter 630 based on the target phase constraint ($\phi_{TARG}$), the zero phase start phase ($\phi_{ZPS}$), and a value of a quadrant (SYNC4T); similarly, a second particular decimator may select and output two samples of a plurality of samples from the short filter 620 based on the target phase constraint ($\phi_{TARG}$), the zero phase start phase ($\phi_{ZPS}$), and a value of a quadrant (SYNC4T).

Referring now to FIG. 6C, an exemplary diagrammatic graph representation 602 of the magnitude response and the phase response of a long filter and a short filter associated with the implementation shown in FIG. 6A for 4T preamble detection without interpolation of some embodiments is shown.

Referring now to FIG. 7A, embodiments of the invention include a system 700 configured to detect the end of a 6T preamble without interpolation. In some embodiments, the system 700 includes a ZPS module 710, a short filter 720, a long filter 730, a decimator 740, and a sign comparator 750. The system 700 may be configured to receive a stream of input samples (e.g., X[0], X[1], X[2], . . . X[k]). In some embodiments, the stream of input samples (e.g., X[0], X[1], X[2], . . . X[k]) may be received from an analog-to-digital converter (ADC) (not shown). The input sample phases may be arbitrary during ZPS phase rotation, and because input sample phases may be arbitrary during ZPS phase rotation, the phase at the outputs of the short filter 720 and the long filter 730 may also be arbitrary without interpolating the input samples.

Still referring to FIG. 7A, in some embodiments, during ZPS with a 6T preamble implementation and while a phase of the input samples (e.g., X) rotates from an arbitrary phase to a target phase, a phase of samples output from the short filter ($Y_S$) 720 and the long filter ($Y_L$) 730 rotates from a shifted arbitrary phase to a shifted target phase. The short filter 720 and the long filter 730 shift the phase of input samples by a phase response of the filters 720, 730 (π/6 at 6T preamble frequency) to output a shifted arbitrary phase (i.e., input arbitrary phase shifted by π/6) and a shifted target phase (i.e., target phase shifted by π/6), wherein the short filter 720 and the long filter 730 may have the same phase response.

For exemplary implementations with a 6T preamble (as shown in FIGS. 7A, 7B, and 7C), the phase of the input samples (e.g., X) may rotate from $$(\phi_{TARG}+SYNC6*(\pi/3)-\phi_{ZPS}) \text{ to } (\phi_{TARG}+SYNC6*(\pi/3)),$$

where $\phi_{TARG}$ is a 6T target phase constraint such that $\phi_{TARG}\epsilon[0:(\pi/3)]$, where $\phi_{ZPS}$ is a ZPS phase such that $\phi_{ZPS}\epsilon[-\pi/6:\pi/6)$, where SYNC6T indicates a hexant of X[0] as it converges to the target phase such that SYNC6T$\epsilon$[0:5]. As the phase of the input samples (e.g., X) rotates from an arbitrary phase to a target phase, the phase of the short filter outputs and the long filter outputs rotates from $$(\phi_{TARG}+SYNC6T*(\pi/3)-\phi_{ZPS}-(\pi/6)) \text{ to } (\phi_{TARG}+SYNC6T*(\pi/3)-(\pi/6)),$$

where ($\pi/6$) is the phase response of the short filter 720 and the long filter 730.

Still referring to FIG. 7A, based upon the 6T target phase constraint (i.e., $\phi_{TARG}$), the hexant value (i.e., SYNC6T), and the ZPS information from the ZPS module phase ($\phi_{ZPS}$), embodiments of the invention are configured to predict the phase of the outputs of the short filter 720 and the long filter 730 at any particular time. Out of every 6 samples during a 6T preamble cycle, two samples of the short filter outputs and two samples of the long filter outputs can be selected based upon the 6T target phase constraint, the hexant, and the ZPS phase. Additionally, embodiments include decimating the short filter samples and the long filter samples such that the selected two samples per preamble cycle are output upon (e.g., after) decimation; the two selected samples tend to be (e.g., are always) distant from zero crossing points and have enough margin for noise to be used for sign comparison by a comparator 750. (In a sinusoidal preamble signal, the zero crossing points are $$P\sin\frac{n\pi}{2}$$

where n is an even integer. So the zero crossing points are 0, 0, 0, 0, . . . ) In some embodiments, decimating the short filter output samples and the long filter output samples by a factor of 3 for a 6T preamble implementation ensures that the down-sampled (e.g., decimated) outputs are closer to peak points based on ZPS and target phase information. (In a sinusoidal preamble signal, the peak points are $$P\sin\frac{n\pi}{2}$$

where n is an odd integer. So the peak points are . . . , P, –P, P, –P, . . . )

Referring now to FIG. 7B, an exemplary decimation table 701 associated with the implementation shown in FIG. 7A for 6T preamble detection without interpolation of some embodiments is shown. The decimation 701 demonstrates exemplary situations for how the decimator 740 will select two samples and perform a decimation for various scenarios. For example, the decimator 740 will select and output two samples of a plurality of samples from the long filter 730 and short filter 720 based on the target phase constraint ($\phi_{TARG}$), the zero phase start phase ($\phi_{ZPS}$), and a value of a hexant (SYNC6T). For example, if the target phase constraint ($\phi_{TARG}$) is between 0 and $\pi/12$, if the zero phase start phase ($\phi_{ZPS}$) is positive (i.e., greater than or equal to zero), and if the value of the hexant (SYNC6T) is 0 or 3, then the Y[2] sample and the Y[5] sample for each of the two filters will be selected for the particular preamble cycle and sent to the sign comparator 750 to determine or detect whether the preamble has ended. Likewise, the decimator 740 may select and output other particular two samples based upon the particular target phase constraint ($\phi_{TARG}$), the particular zero phase start phase ($\phi_{ZPS}$), and the particular hexant (SYNC6T) for each particular preamble cycle, as shown in FIG. 7B. In some embodiments, the decimator 740 is implemented as two or more decimators. For example, a first particular decimator may select and output two samples of a plurality of samples from the long filter 730 based on the target phase constraint ($\phi_{TARG}$), the zero phase start phase ($\phi_{ZPS}$), and a value of a hexant (SYNC6T); similarly, a second particular decimator may select and output two samples of a plurality of samples from the short filter 720 based on the target phase constraint ($\phi_{TARG}$), the zero phase start phase ($\phi_{ZPS}$), and a value of a hexant (SYNC6T).

Referring now to FIG. 7C, an exemplary diagrammatic graph representation 702 of the magnitude response and the phase response of a long filter and a short filter associated with the implementation shown in FIG. 7A for 6T preamble detection without interpolation of some embodiments is shown.

Figure 8:
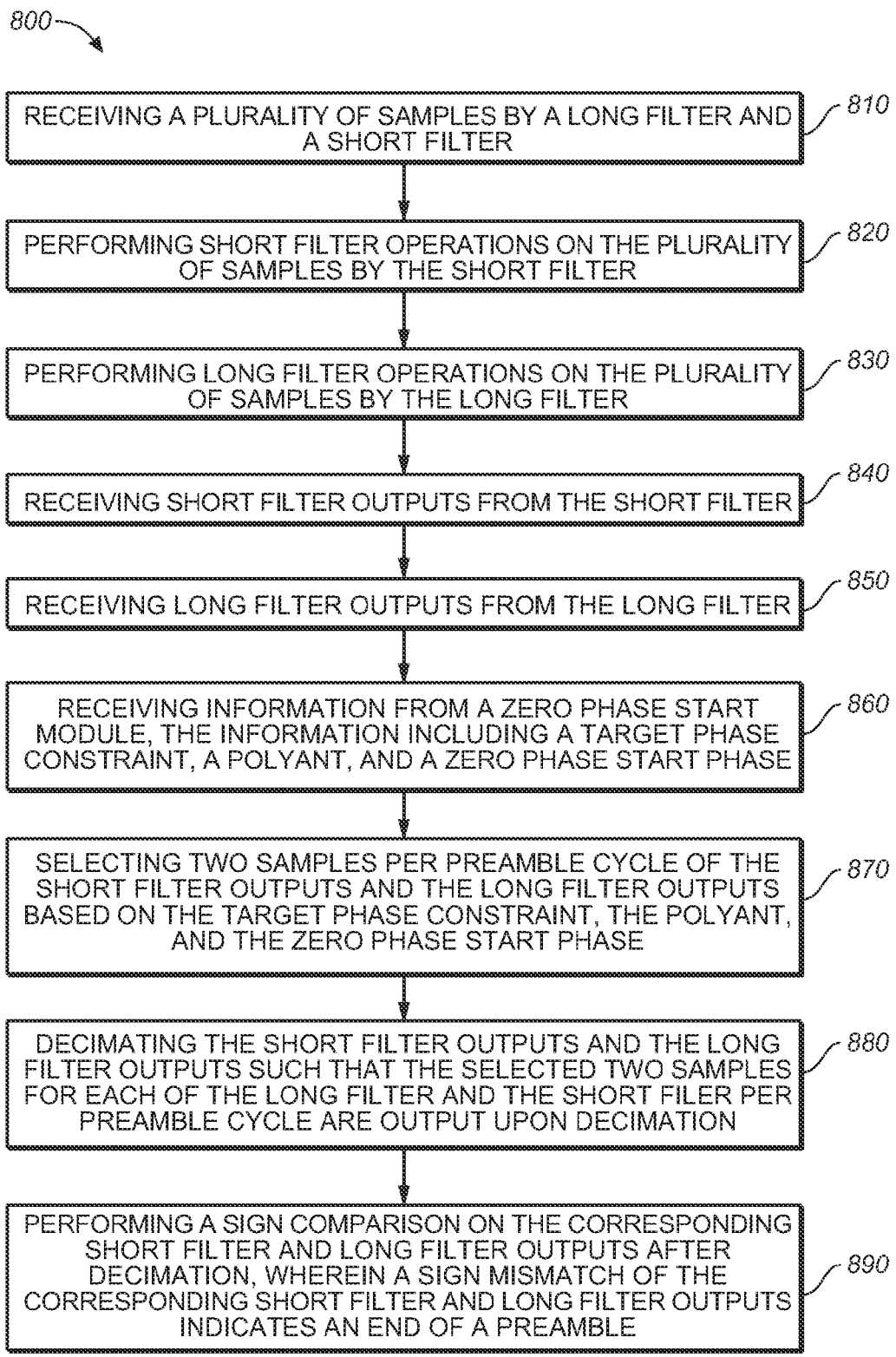
FIG. 8 shows a flow diagram of a method of some embodiments.

Referring to FIG. 8, an embodiment of the invention includes a method 800 for detecting an end of a preamble without interpolation. It is contemplated that embodiments of the method 800 can be performed by a control system 220; a read channel of a storage device 220 or storage system; at least one component, circuit, or module of the control system 220, of a storage device 200, of a storage device, or of a computing device; the system 600, 700; at least one component, circuit, or module of the system 600, 700; software or firmware executed on a computing device (such as the control system 220, a controller, a storage device, a storage system, or a processor); other computing devices; other computer components; or on other software, firmware, or middleware of the system topology 100. The method 800 can include any or all of steps 810, 820, 830, 840, 850, 860, 870, 880, and/or 890, and it is contemplated that the method 800 can include additional steps as disclosed throughout, but not explicitly set forth in this paragraph. Further, it is fully contemplated that the steps of the method 800 can be performed concurrently or in a non-sequential order. Likewise, it is fully contemplated that the method 800 can be performed prior to, concurrently, subsequent to, or in combination with the performance of one or more steps of one or more other embodied methods disclosed throughout.

Some embodiments of the method 800 include a step 810, wherein the step 810 comprises receiving a plurality of samples by a long filter and a short filter. Some embodiments of the method 800 also include a step 820, wherein the step 820 comprises performing short filter operations on the plurality of samples by the short filter. Some embodiments of the method 800 further include a step 830, wherein the step 830 comprises performing long filter operations on the plurality of samples by the long filter. Some embodiments of the method 800 include a step 840, wherein the step 840 comprises receiving short filter outputs from the short filter. Some embodiments of the method 800 include a step 850, wherein the step 850 comprises receiving long filter outputs from the long filter. Some embodiments of the method 800 also include a step 860, wherein the step 860 comprises receiving information from a zero phase start module, the information including a target phase constraint, a polyant, and a zero phase start phase. For example, in some embodiments, the polyant is a quadrant, and the preamble is implemented as a 4T preamble; in some other embodiments, the polyant is a hexant, and the preamble is implemented as a 6T preamble. Some embodiments of the method 800 further include a step 870, wherein the step 870 comprises selecting two samples per preamble cycle for each of the short filter outputs and the long filter outputs based on the target phase constraint, the polyant, and the zero phase start phase. In some embodiments, the selected samples per preamble cycle include two samples from the short filter and two samples from the long filter. Additionally, in some embodiments, the selected two samples for each of short filter and long filter outputs per preamble cycle have a higher noise margin value than an average noise margin value of unselected samples per preamble cycle. Some embodiments of the method 800 include a step 880, wherein the step 880 comprises decimating (e.g., by a factor of 2 for 4T preamble implementations, by a factor of 3 for 6T preamble implementations, or the like) the short filter outputs and the long filter outputs such that the selected two samples for each of these filters per preamble cycle are output upon decimation. Some embodiments of the method 800 include a step 890, wherein the step 890 comprises performing a sign comparison on the corresponding short filter and long filter outputs after decimation, wherein a sign mismatch of corresponding short filter and long filter outputs indicates an end of a preamble. In some embodiments, the method 800 includes performing one or more additional operations. Embodiments of the invention include detecting the end of the preamble without interpolation. Furthermore, some embodiments include predicting a phase of the short filter outputs and the long filter outputs based on the target phase constraint, the polyant, and the zero phase start phase.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
receiving a plurality of samples by a long filter and a short filter;
performing short filter operations on the plurality of samples by the short filter;
performing long filter operations on the plurality of samples by the long filter;
receiving short filter outputs from the short filter;
receiving long filter outputs from the long filter;
receiving information from a zero phase start module, the information including a target phase constraint, a polyant, and a zero phase start phase;
selecting two samples per preamble cycle of the short filter outputs and the long filter outputs based on the target phase constraint, the polyant, and the zero phase start phase;
decimating the short filter outputs and the long filter outputs such that the selected two samples for each of the long filter and the short filer per preamble cycle are output upon decimation; and
performing a sign comparison on the corresponding short filter and long filter outputs after decimation, wherein a sign mismatch of the corresponding short filter and long filter outputs indicates an end of a preamble.

2. The method of claim 1, further comprising:
detecting the end of the preamble without interpolation.

3. The method of claim 1, wherein the polyant is a quadrant, and wherein the preamble is implemented as a 4T preamble.

4. The method of claim 3, wherein decimating the short filter outputs and the long filter outputs such that the selected two samples for each of the long filter and the short filter per preamble cycle are output upon decimation further comprises:

decimating, by a factor of 2, the short filter outputs and the long filter outputs such that the selected two samples for each of the long filter and the short filter per preamble cycle are output upon decimation.

5. The method of claim 1, wherein the polyant is a hexant, and wherein the preamble is implemented as a 6T preamble.

6. The method of claim 5, wherein decimating the short filter outputs and the long filter outputs such that the selected two samples for each of the long filter and the short filter per preamble cycle are output upon decimation further comprises:

decimating, by a factor of 3, the short filter outputs and the long filter outputs such that the selected two samples for each of the long filter and the short filter per preamble cycle are output upon decimation.

7. The method of claim 1, wherein the selected samples per preamble cycle include two samples from the short filter and two samples from the long filter.

8. The method of claim 1, wherein the long filter and the short filter have a same magnitude response and a same phase response at an NT preamble frequency.

9. The method of claim 1, wherein the selected two samples for each of the long filter and the short filter per preamble cycle have a higher noise margin value than an average noise margin value of unselected samples per preamble cycle.

10. The method of claim 1, further comprising:
predicting a phase of the short filter outputs and the long filter outputs based on the target phase constraint, the polyant, and the zero phase start phase.

11. A storage system, comprising:
a short filter, wherein the short filter is configured to receive a plurality of samples and perform short filter operations on the plurality of samples;
a long filter wherein the long filter is configured to receive a plurality of samples and perform long filter operations on the plurality of samples;
a zero phase start module configured to provide information including a target phase constraint, a polyant, and a zero phase start phase;
at least one decimator, the at least one decimator being communicatively coupled to the short filter, the long filter, the zero phase start module, and a comparator, wherein the at least one decimator is configured to:
receive short filter outputs from the short filter;
receive long filter outputs from the long filter;
receive information from the zero phase start module, the information including the target phase constraint, the polyant, and the zero phase start phase;
select two samples for each of the short filter outputs and long filter outputs per preamble cycle based on the target phase constraint, the polyant, and the zero phase start phase; and
decimate the short filter outputs and the long filter outputs such that the selected two samples per filter per preamble cycle are output upon decimation; and
the comparator, wherein the comparator is configured to:
perform a sign comparison on the corresponding short filter and long filter outputs after decimation, wherein a sign mismatch of the corresponding short filter and long filter outputs indicates an end of a preamble.

12. The storage system of claim 11, wherein the end of the preamble is detected without interpolation.

13. The storage system of claim 11, wherein the storage system is implemented as a RAID (redundant array of independent storage devices) system.

14. The storage system of claim 11, wherein the storage system comprises at least one hard disk drive.

15. The storage system of claim 11, wherein the selected two samples for each of the long filter and the short filter per preamble cycle have a higher noise margin value than an average noise margin value of unselected samples per preamble cycle.

16. A circuit, comprising:
at least one decimator, wherein the at least one decimator is configured to:
receive short filter outputs from a short filter;
receive long filter outputs from a long filter;
receive information from a zero phase start module, the information including a target phase constraint, a polyant, and a zero phase start phase;
select two samples per preamble cycle of the short filter outputs and the long filter outputs based on the target phase constraint, the polyant, and the zero phase start phase; and
decimate the short filter outputs and the long filter outputs such that the selected two samples for each of the long filter and the short filter per preamble cycle are output upon decimation; and
a comparator, wherein the comparator is configured to:
perform a sign comparison on the corresponding short filter and long filter outputs after decimation, wherein a sign mismatch of the corresponding short filter and long filter outputs indicates an end of a preamble.

17. The circuit of claim 16, further comprising:
the short filter, wherein the short filter is configured to receive a plurality of samples and perform short filter operations on the plurality of samples;
the long filter, wherein the long filter is configured to receive a plurality of samples and perform long filter operations on the plurality of samples; and
the zero phase start module, wherein the zero phase start module is configured to provide information including the target phase constraint, the polyant, and the zero phase start phase.

18. The circuit of claim 16, wherein the circuit comprises an integrated circuit implemented as at least one of a read channel, a read-write channel, a multi-sensor channel, data signal processing circuitry, or a communication channel.

19. The circuit of claim 16, wherein the end of the preamble is detected without interpolation.

20. The circuit of claim 16, wherein the selected two samples for each of the long filter and the short filter per preamble cycle have a higher noise margin value than an average noise margin value of unselected samples per preamble cycle.

* * * * *